United States Patent
Clark et al.

(10) Patent No.: US 8,756,321 B2
(45) Date of Patent: Jun. 17, 2014

(54) SERVICE LEVEL SELECTION METHOD AND SYSTEM

(75) Inventors: David William Clark, Carp (CA); Sean MacLean Murray, Ottawa (CA)

(73) Assignee: BCE Inc., Verdun, Quebec (CA)

(*) Notice: Subject to any disclaimer, the term of this patent is extended or adjusted under 35 U.S.C. 154(b) by 917 days.

(21) Appl. No.: 12/665,901

(22) PCT Filed: Dec. 23, 2008

(86) PCT No.: PCT/CA2008/002283
§ 371 (c)(1),
(2), (4) Date: Dec. 21, 2009

(87) PCT Pub. No.: WO2010/071962
PCT Pub. Date: Jul. 1, 2010

(65) Prior Publication Data
US 2011/0202405 A1    Aug. 18, 2011

(51) Int. Cl.
*G06F 15/173*    (2006.01)

(52) U.S. Cl.
USPC ............................ 709/226; 709/224; 709/228

(58) Field of Classification Search
None
See application file for complete search history.

(56) References Cited

U.S. PATENT DOCUMENTS

| | | | |
|---|---|---|---|
| 6,871,233 B1 * | 3/2005 | Bearden et al. | 709/226 |
| 6,944,166 B1 | 9/2005 | Perinpanathan et al. | |
| 7,911,964 B1 * | 3/2011 | Ahmad et al. | 370/252 |
| 8,050,275 B1 * | 11/2011 | Iyer | 370/395.21 |
| 2001/0044845 A1 | 11/2001 | Cloonan et al. | |
| 2004/0064555 A1 * | 4/2004 | Cuny et al. | 709/225 |
| 2007/0133428 A1 | 6/2007 | Taylor et al. | |
| 2007/0180061 A1 * | 8/2007 | Bantz et al. | 709/219 |
| 2011/0111729 A1 * | 5/2011 | Poltorak et al. | 455/406 |

FOREIGN PATENT DOCUMENTS

| | | |
|---|---|---|
| CA | 2557094 | 2/2007 |
| EP | 1009135 | 6/2000 |
| WO | 2006115624 | 11/2006 |

OTHER PUBLICATIONS

International Search Report mailed on Sep. 25, 2009 in connection with International patent application PCT/CA2008/002283.
Written Opinion mailed on Sep. 25, 2009 in connection with International patent application PCT/CA2008/002283.

* cited by examiner

Primary Examiner — Mohamed Ibrahim

(57) ABSTRACT

A method, system and graphical user interface for service level selection, for use in connection with a data network that supports multiple service levels. A server monitors usage of a network to identify a communication session and a service level associated with the communication session. The server may also monitor a global usage of the data network. The server determines at least one alternative service level for the communication session and causes conveyance of an offer of a choice of the at least one alternative service level. A graphical user interface causes information regarding the offer to be displayed and allows a user to identify a selected one of the at least one alternative service level. In response to user input identifying the selected service level, the server causes a change in the service level for the communication session.

72 Claims, 9 Drawing Sheets

FIG. 9

E-mail message

From: serviceoffer@augservs.com
To: administrator@xyzinc.com
Subject: Augmented Services available!

910 → Augmented Services are available.

Current Sessions:

| User | Session Type | Active Since |
|---|---|---|
| Manager 1 | Videoconference | 3 minutes |
| Employee 4 | Teleconference | 40 minutes |

920

Currently available upgrades:

915 →

916 — 930 — Option 1: Upgrade both these sessions to High-Speed Service
To select this option, please reply to this e-mail with the words "option 1" in the subject line or click <u>here</u> — 932

916 — 935 — Option 2: Upgrade all teleconferences to High-Speed Service for the remainder of today, October 29, 2008
931 — To select this option, please reply to this e-mail with the words "option 2" in the subject line or click <u>here</u>

916 — 940 — Option 3: Customize your upgrade

<u>Click here to go to the service customization page</u>

905

SERVICE LEVEL SELECTION METHOD AND SYSTEM

FIELD OF THE INVENTION

The present invention relates to network communication and more particularly to service level selection methods and systems for use in network communication.

BACKGROUND

In the context of telecommunications, certain approaches have been developed to provide differentiated data transmission service within a data network. Certain solutions are broadly grouped under the name Quality of Service (QoS) which is a term often used to refer to a number of different data-delivery guarantees or resource reservation control to achieve different levels of service for some particular data. Packet-based networks such as the Internet tend to employ best-effort forwarding strategies whereby packets travel through the network with no particular guarantees regarding travel time or jitter. Certain network services or traffic types, however require or would benefit from certain guarantees or preferential treatment, and systems have been developed to provide higher priority for certain packets and to guarantee certain QoS standards for traffic that is more sensitive.

However, providing improved service levels for certain packets adds a burden on network resources such that it is not usually possible to maintain the highest levels of service for every packet travelling through a network section. In this context it is necessary to limit the assignment of "high-priority" to only packets associated with critical services or services that require a high service level. Access to high-priority service levels is usually restricted only to certain data, with the goal of ensuring that the demand on network resources imposed by high priority data does not surpass the availability of the network resources. For example, in order to reduce the possibility of excess demand for network resources, priority levels are usually conservatively assigned and certain services, such as peer-to-peer (P2P) applications, that would otherwise overwhelm the network are frequently "choked".

However, existing methods for subsequently varying service level are cumbersome and/or intrusive, or do not involve customer control. Accordingly, there is a need in the industry for improved methods and systems for permitting service level modifications.

SUMMARY OF THE INVENTION

In accordance with a first broad aspect, the present invention provides a method comprising the step of monitoring usage of a network to identify a communication session and a service level associated with the communication session. The method further comprises the step of determining at least one alternative service level for the communication session. The method still further comprises the step of causing conveyance of an offer of a choice of the at least one alternative service level. The method still further comprises the step of receiving an input responsive to the offer. The method still further comprises the step of responsive to the input being indicative of acceptance of the offer, causing a change in the service level associated with the communication session to a selected one of the at least one alternative service level.

In accordance with a second broad aspect, the present invention provides a computer program product, comprising a computer usable medium having a computer readable program code embodied therein, said computer readable program code adapted to be executed to implement a method. The method comprises the steps of monitoring usage of a network to identify a communication session and a service level associated with the communication session. The method further comprises the steps of determining at least one alternative service level for the communication session. The method still further comprises the steps of causing conveyance of an offer of a choice of the at least one alternative service level. The method still further comprises the steps of receiving an input responsive to the offer. The method still further comprises the steps of responsive to the input being indicative of acceptance of the offer, causing a change in the service level associated with the communication session to a selected one of the at least one alternative service level.

In accordance with a third broad aspect, the present invention provides a graphical user interface implemented on a network communication device configured to conduct a communication session associated with a service level. The graphical user interface comprises a first display component configured to be displayed upon receipt from an entity external to the network communication device of a command, the display component indicative of an availability of at least one alternative service level for the communication session. The graphical user interface further comprises a selection tool for allowing the offer to be accepted, thereby to cause a change in the service level associated with the communication session.

In accordance with a fourth broad aspect, the present invention provides a system comprising a network monitoring module for monitoring usage of a network to identify a communication session and service level associated with the communication session. The system further comprises a service level analysis module for determining at least one alternative service level for the communication session. The system still further comprises a communication processing entity. The communication processing entity is for causing conveyance of an offer of a choice of the at least one alternative service level. The communication processing entity is also for receiving an input responsive to the offer. The communication processing entity is also for responsive to the input being indicative of acceptance of the offer, causing a change in the service level associated with the communication session to a selected one of the at least one alternative service level.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which:

FIG. 9 shows an exemplary e-mail message including multiple options.

Figure 1:
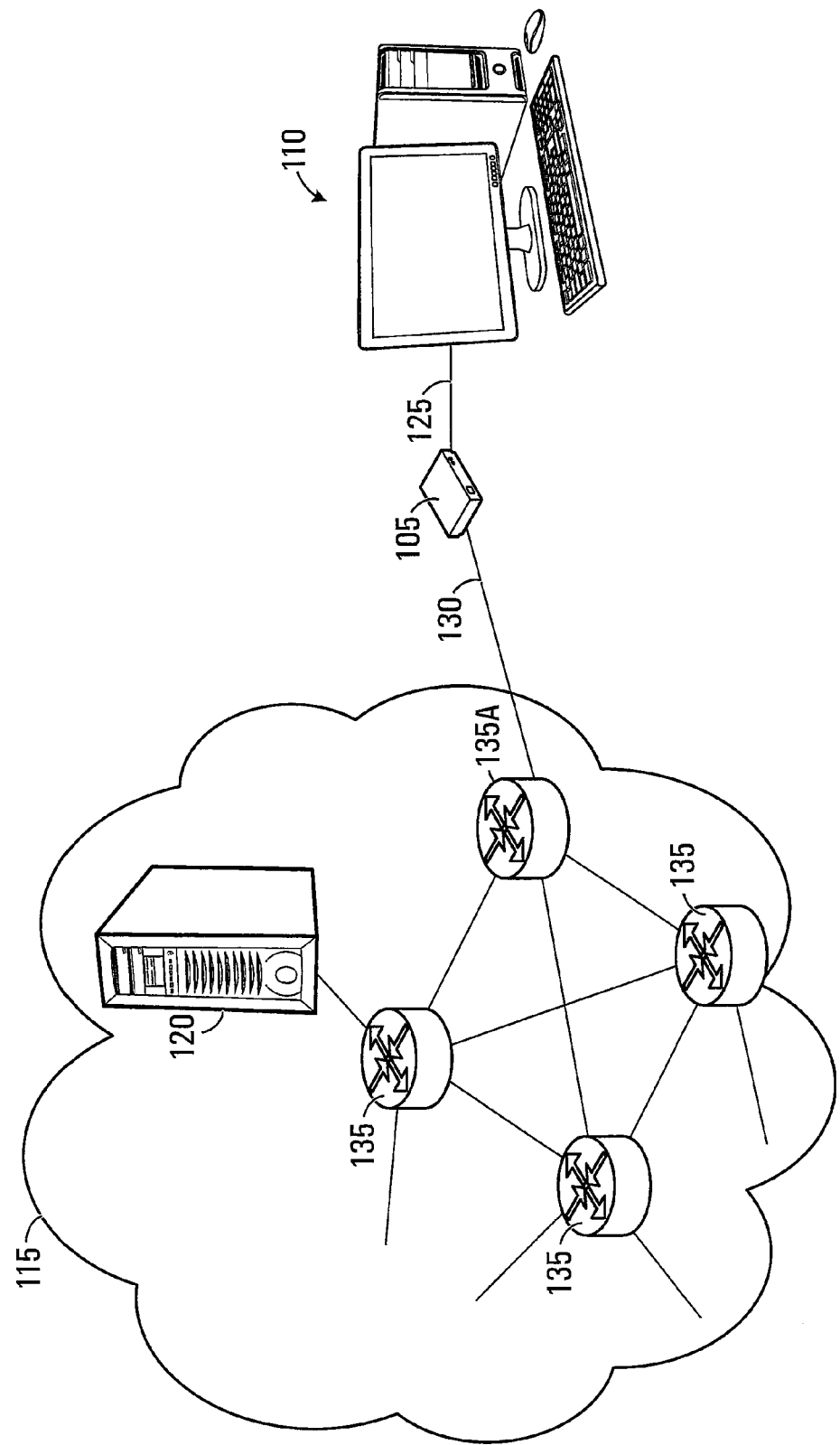
FIG. 1 shows a network architecture in accordance with a non-limiting embodiment.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a network architecture in accordance with a non-limiting embodiment. A computer 110 serves as a network communication device and provides a platform on which networking applications run. The computer 110 is connected to a data network 115 via a network access component 105. The network access component 105 can be any hardware or software that enables access to the data network 115 and in the example shown in FIG. 1, the network access component 105 is an external broadband modem connected to the computer 110 by an Ethernet connection 125. The data network 115 can be any network of data processing equipment and can include network equipment such as routers 135 interconnected in any particular arrangement. In the example provided here, the data network 115 is an IP network in communication with other IP networks such as portions of the internet. A server 120, the functionality of which will be described further below, is present in the data network 115. Connectivity between the network access component 105 and the data network 115 is provided by a communication link 130 which in the example shown is a connection between the network access component 105 and a particular one of the routers 135. For the present example, communication link 130 is associated with a particular customer of network access services that is the holder of a network service account. Although only one computer 110 is shown here, there may be more network communication devices connected to the data network 115 via communication link 130. Likewise, there maybe one or more users of network communication device(s) communicating over communication link 130.

Figure 2:
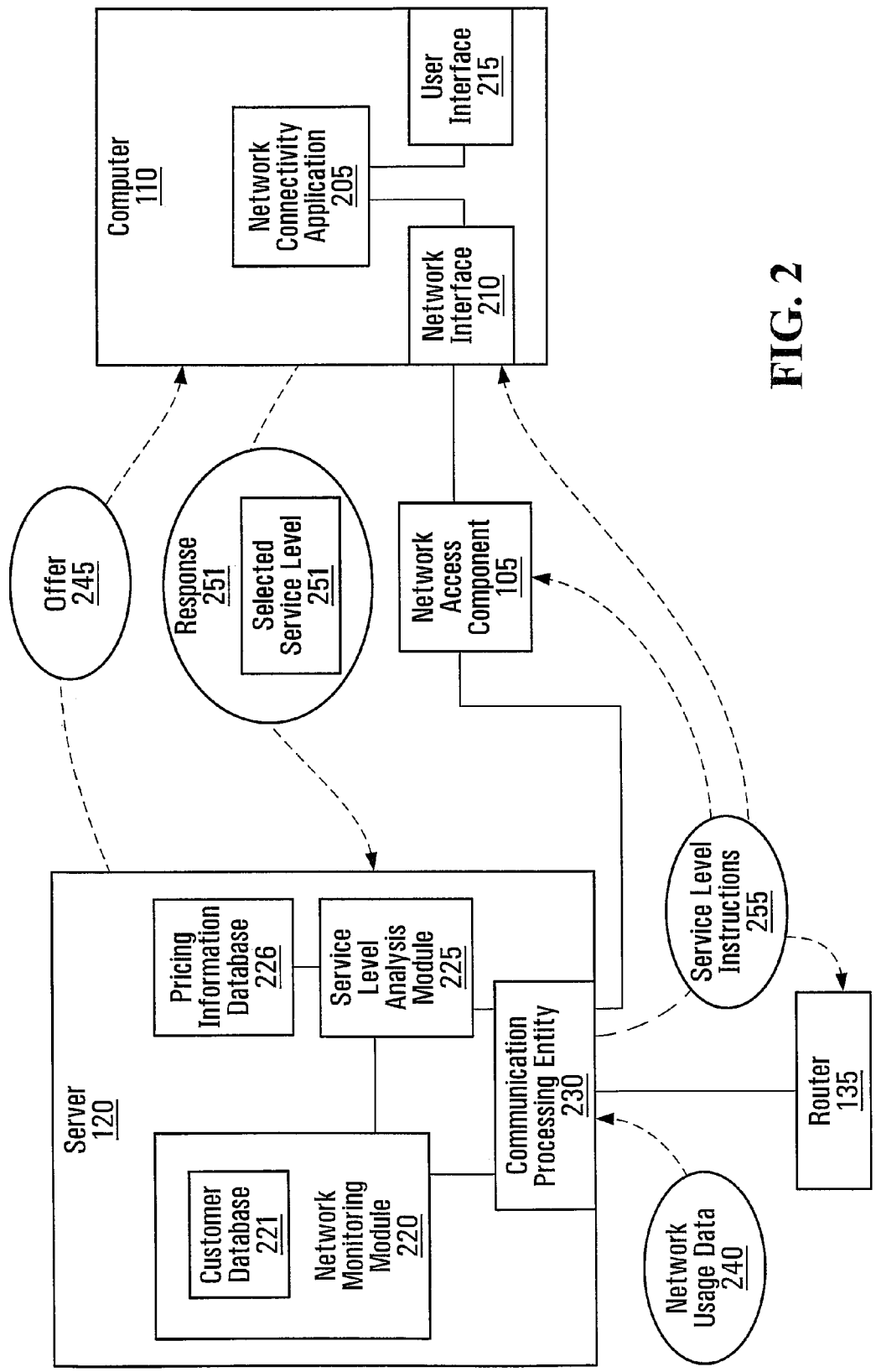
FIG. 2 shows a block diagram of a portion the system shown in FIG. 1.

FIG. 2 shows a block diagram of a portion of the system shown in FIG. 1, comprising the computer 110, the server 120, the network access component 105 and a given one of the routers 135, herein denoted 135a. The computer 110 comprises a network interface 210 which in this case is an Ethernet interface for communicating with the network access component 105. The computer 110 further comprises a user interface 215 which includes physical input and output devices, such as a monitor, keyboard and mouse, for interfacing with a user (not shown). The computer 110 runs a network connectivity application 205 that interfaces with the user via the user interface 215 and engages in a communication session over the data network 115 via the network interface 210. The network connectivity application 205 may be any application that engages in a communication session over the data network 115, such as a peer-to-peer (P2P) application, a VoIP client, an instantiation of a video game, a web browser, a web-based application or a streaming-video viewer. It should also be noted that although the network communication device is exemplified here by the computer 110, the present invention is not limited to computers and may be applied with other devices suitable for running the network connectivity application 205, including dedicated devices. As such, gaining consoles, VoIP telephones, cellular telephones and IPTV set-top boxes may replace the computer 110 in the example shown here.

A communication session has a service level associated therewith. The data network 115 is capable of providing differentiated services based on service level. Any particular means of providing differentiated service may be employed in the data network 115, such as known QoS resource reservation control mechanisms. A plurality of service levels offered may, for example, each represent either certain rules according to which associated data should be treated (by network equipment), a certain delivery guarantee for the associated data, a certain priority to be given to the associated data (over other data), or any combination thereof. Generally, a service level is said to be "higher" than another if the data associated with it is expected to be transmitted "better". The measure used to determine a "better" transmission, however, may vary widely. For example, in certain settings the better of two transmissions may be the one with the lower transmission delay. Elsewhere, lower jitter may be the sought after characteristic for a connection. Elsewhere still, a transmission may be judged based on a combination of the transmission delay and jitter associated with it. It is to be understood that any suitable measure may be used to compare service levels, including transmission delay, jitter, route, or any other known measures or any combination of measures. In certain embodiments, a service level may be associated with one or more particular links within the data network 115 (or another network or within multiple networks), the bandwidth (or other characteristic) of the particular link(s) being partially or wholly determinative of the service level. For example, data associated with a high service level may be routed through pre-provisioned high-bandwidth links, while data associated with a lower service level may be routed through other, lower-bandwidth links.

The server 120 is in communication with the network access component 105 through the data network 115 and comprises a network monitoring module 220, a service level analysis module 225, a communication processing entity 230 and, optionally, a pricing information database 226. The network monitoring module 220 monitors usage of the data network 115 to identify a communication session involving a customer and a service level associated with the communication session, as will be described in more detail below. The network monitoring module 220 includes a customer database 221 which stores information necessary for identifying individual customers. In this example, the customers are network access service customers, each associated with a particular communication link. The customer database 221 stores information necessary for identifying particular communication links and the customer associated with each particular communication link. For example, if each communication link is associated with a unique IP address, the customer database 221 may store associations between IP addresses and customers. The service level analysis module 225 can determine one or more alternative service levels for each communication session identified by the network monitoring module 220, as will be described in more detail below. The pricing information database 226 in communication with the service level analysis module 225 may optionally be provided, as will be discussed in more detail below. The communication processing entity 230 provides access to the data network 115 for communicating with other entities within or connected to the data network 115, such as the routers 135 (including router 135a) and the network access component 105. It should be noted that the link shown in FIG. 2 between the server 120 and the network access component 105 is a logical one, the actual connection being made through the data network 115.

Figure 3:
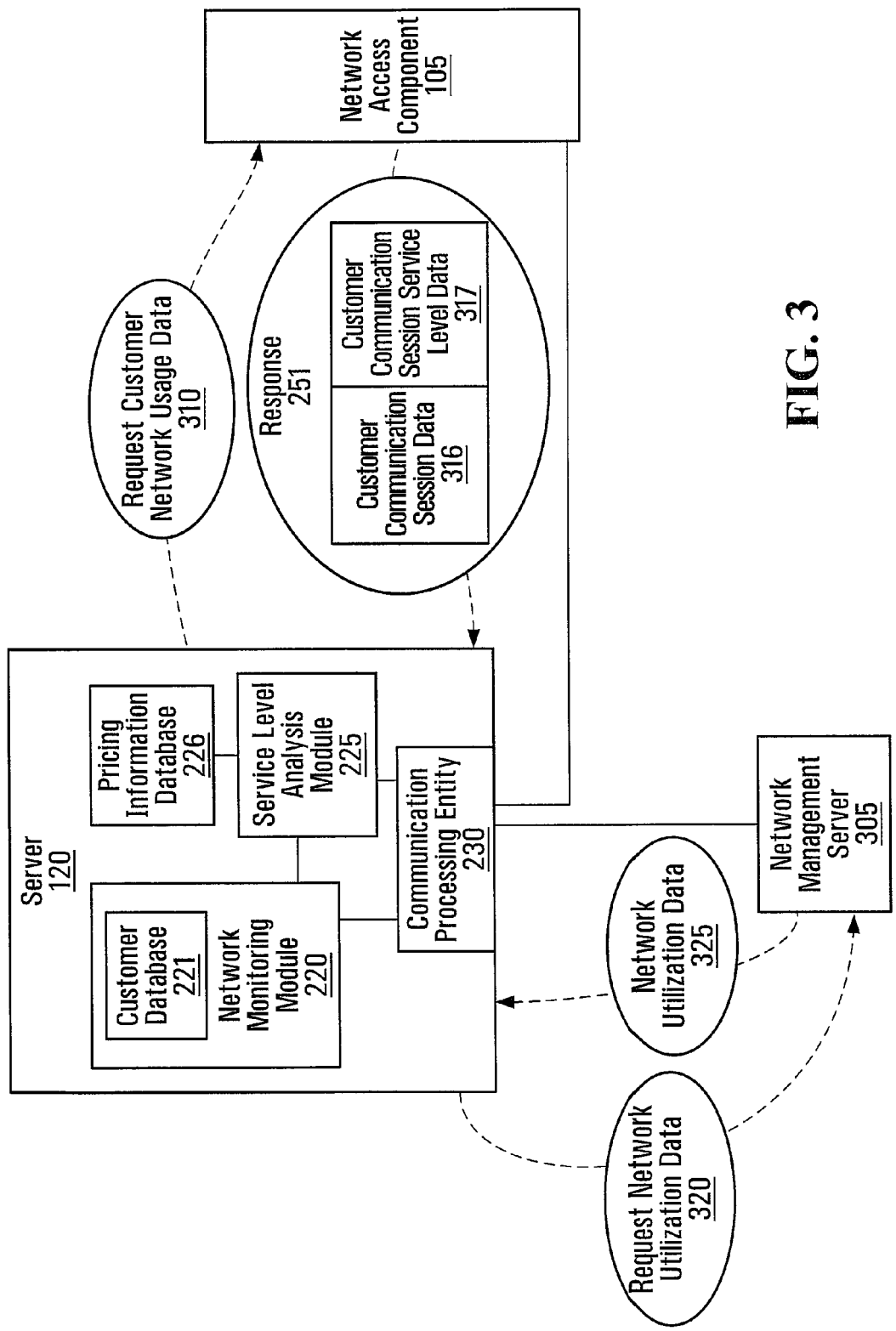
FIG. 3 shows a block diagram of another portion of the system shown in FIG. 1.

FIG. 2 also shows various interactions involving the entities described above. In one such interaction, network usage data 240 is acquired by the server 120 for analysis by the network monitoring module 220. The network usage data 240 may be acquired in any of a number of ways, the invention not being limited to any particular mechanism used for the acquisition of network usage data. FIG. 3 shows an exemplary scheme for network usage data acquisition. In this non-limiting example, the network usage data 240 comprises customer network usage data 315 sent to the network monitoring module 220 by the network access component 105. The customer network usage data 315 represents usage of the data network 115 over communication link 130. Included within the customer network usage data 315 is data on the network usage of a user at the computer 110 involved in a particular communication session. Here, the customer network usage data 315 is sent in response to a request 310 from the network monitoring module 220, although it could also be sent unrequestedly, e.g. periodically or upon the initiation of a new communication session involving the user. Customer database 221 comprises customer information, such as a customer identifier (e.g. IP address, e-mail address, SIP ID, telephone number, or any unique customer-specific number) which is used to identify where to transmit request 310 (or to identify the customer whose customer network usage data is received unrequestedly). In this example, the customer network usage data 315 includes customer communication session data 316 which identifies all the communication sessions over communication link 130. In an alternative embodiment, however, the customer network usage data 315 may include only information on a subset of all current communication sessions over the communication link 130; e.g. it may only include an identifier of a recently-initiated communication session, or only identifiers of certain types of communication session (e.g. VoIP sessions, gaming sessions or peer-to-peer sessions).

Based on the customer network usage data 315, the network monitoring module 220 identifies the particular communication session involving the user and the service level associated with the particular communication session. The invention is not intended to be limited to any particular way of identifying the service level associated with the particular communication session. In the example shown in FIG. 3, the network monitoring module 220 explicitly receives customer communication session service level data 317 with the customer network usage data 315. The customer communication session service level data 317 comprises an indication of the service level for each of the communication sessions identified in the customer communication session data 316. In other embodiments, however, the network monitoring module 220 may employ other means of identifying the service level for communication sessions involving the customer. For example, the network monitoring module 220 may identify the service level of a communication session based on knowledge of the type of communication session (e.g. VoIP session, P2P session, etc. . . . ), on knowledge of the customer, or on knowledge of another party involved in the communication session.

In the present example, the network monitoring module 220 also receives network utilization data 325. The network utilization data 325 may be non-customer-specific and reflects a level of network utilization. For instance, the network utilization data 325 may include information on a level of occupancy of specific network equipment or may include information on a global amount of use of the data network 115 (or portion thereof). To receive the network utilization data 325, the network monitoring module 220 may send a request 320 to a network management server 305 which keeps track of network utilization and performs various network management functions. The network management server 305 replies with the network utilization data 325. In other embodiments, the network management server 305 may send the network utilization data 325 to the server 120 in response to any other trigger instead of, or in addition to, a request from the server 120. For example, the network management server 305 may send the network utilization data to the server 120 when the network utilization reaches a certain threshold (e.g. when the network utilization becomes particularly low or particularly high, or when it has increased or decreased by a particular amount). From the network utilization data 325, the network monitoring module 220 determines an availability of network resources, which in this example is a number of additional communication sessions that can be supported at each possible service level. For example, if the network management server 305 sends network utilization data 325 in response to the network utilization reaching any or a plurality of thresholds, the network utilization data 325 may comprise an indication of the particular threshold that was reached. In this case, the network monitoring module 220 may be configured to determine the availability of network resources based on the particular threshold. Other formats for the network utilization data 325 are of course possible. In another example, it is known that the data network 115 can safely handle up to a certain number of simultaneous communication sessions at the highest service level and the network utilization data 325 indicates that there are one hundred fewer of these highest-service-level communication sessions active. Here, the network monitoring module 220 may determine from the network utilization data 325 that up to one hundred existing lower-service level communication sessions may be assigned the highest service level. The availability of network resources may yet be defined in many other ways, such as using a global "network resource availability" value based on which the number of additional connection sessions at various service levels may be determined. Alternatively still, availability of network resources may define the availability of individual network equipment or communication links separately, for instance as an available bandwidth at each of the routers 135 or within certain communication links.

The network monitoring module 220 provides the service level analysis module 225 with information on the particular communication session, on the service level associated with the particular communication session, and on the availability of network resources. Based on this information, the service level analysis module 225 attempts to determine at least one alternative service level for the particular communication session.

In the example provided here, the availability of network resources is provided to the service level analysis module 225 in the form of the number of additional sessions at each possible service level that the data network 115 would be able to support. Based on this and on the service level found to be associated with the particular communication session, the service level analysis module 225 determines whether the data network 115 can safely handle changing the service level associated with the particular communication session, and to which service levels the particular communication session may be changed.

The service level analysis module 225 may also apply additional constraints. In this example, once the service level analysis module 225 has identified a set of different service levels to which the particular communication session can safely be changed, the service level analysis module 225 may then discard all those service levels that are below the current service level associated with the particular communication session. Also, if the information on the particular communication session received from the network monitoring module 220 includes an indication of the type of the particular communication session, the service level analysis module 225 may discard certain service levels that are not appropriate for the type of the particular communication session (e.g., if P2P communication sessions have a particular maximum service level threshold, it may accordingly discard any service level above this threshold). To this end, the service level analysis module 225 may have stored knowledge of which service levels are appropriate for which types of communication sessions. The service level analysis module 225 may also discard any service levels, the change to which would not result in a significant improvement over the service level of the particular communication session as determined using any particular metric (e.g. transmission delay, jitter, etc. . . . ). In addition, customer database 221 may include information on preferred or inappropriate service levels for a particular customer, which information may be used as a filter to further discard certain service levels.

After the service level analysis module 225 has determined all the appropriate service levels to which the particular communication session can be changed, the existence of at least one alternative service level (as will be assumed for the purposes of this description) leads to the issuance of an offer, as described below.

In addition, having identified the at least one alternative service level for the particular communication session, the service level analysis module 225 may optionally determine a price associated with a change to each of the at least one alternative service level. In a non-limiting embodiment, every service level supported by the data network 115 is associated with a set price and the service level analysis module 225 simply looks up the price for each of the at least one alternative service level in a price table held in the pricing information database 226. However, in other embodiments, additional factors may influence the price of a change in service level such as:
- the time of day,
- the level of network utilization (or the availability of network resources),
- customer parameters that may be stored in customer database 221, such as an "account type", a number of available "upgrade credits" (described further below), and
- the type of the particular communication session.

Prices associated with changes in service level can be influenced by a combination of the above, or other, factors. As such, the pricing information database 226 may hold various parameters (e.g. price modifiers for each of the above factors) to permit the service level analysis module 225 to calculate a price. In a non-limiting embodiment, the price associated with a particular change in the service level varies as a monotonically decreasing function of the availability of network resources. Thus, when there is a high availability of network resources, the price for an upgrade to a higher service level may be relatively low. As the availability of network resources decreases, the price associated with the same upgrade may increase (e.g. linearly, exponentially or in any other manner). Thus prices may be set such as to render an increase in service level attractive when the availability of network resources is high, and less attractive when the availability of network resources is low.

The price associated with a change of service level may be expressed in many different ways. For example, the price may be dependent on the duration of the change and may be expressed as a price per quantity of time, such as a dollars-per-hour of improved service level. Alternatively still, the price may be a price per quantity of data such as a cents-per-megabytes value. Alternatively, the price may be a price per communication session, for example a flat fee to upgrade the service level associated with one particular VoIP call. Any one way (or any combination of ways) of expressing the price may be employed and the service level analysis module 225 may determine the prices in more than one way. Accordingly, the pricing information database 226 may include for each parameter or table entry alluded to above, data corresponding to each different way of expressing the price.

Once the at least one alternative service level for the particular communication session has been identified, an offer 245 is conveyed to the user. The offer 245 is unsolicited to the extent that it is not responsive to any indication by the user specifically of a desire for a change of service level at the particular time at which it is received or for the particular communication session to which it pertains. Rather, the conveyance of the offer 245, along with any of the precursory steps described above, can be triggered by another event, such as is now described:

In one embodiment, the network monitoring module 220 continuously (or periodically) monitors network utilization and the conveyance of the offer 245 is triggered by the discovery of favorable network conditions (e.g. low utilization) by the network monitoring module 220. In this embodiment, if multiple different customers are present, the selection of the customer(s) to which to convey the offer 245 (which may be done by the network monitoring module 220) may be carried out randomly, sequentially, according to a priority sequence, according to each customer's network usage, or according to any other factor. For example, the selection of the customer(s) to which to convey the offer 245 may be based on an average monthly customer billing, based on past acceptances of other offers, or based on potential effect (benefit or other) of an acceptance of the offer 245. For example, in certain conditions it may be preferable to convey an offer to a customer that is expected to experience a large improvement in transmission rate if accepted. In other conditions, it may be better (e.g. more profitable) to convey offers to many customers that are each expected to experience a smaller improvement in transmission rate by accepting. There are many other factors that may influence the selection of the customer(s) to which to convey the offer 245, such as past customer behavior (e.g. marketing data) or other knowledge, all of which, and all combinations of which, are within the intended scope of the present invention.

In another embodiment, which departs from what is illustrated in FIG. 3, the offer 245 is triggered by the initiation of a communication session. To begin with, in this embodiment, the transmission of the customer network usage data 315 to the server 120 is triggered not by request 310 but by the initiation of the communication session. Here, the receipt at server 120 of the customer network usage data 315 triggers the process of determining whether an alternative service level can be offered for the particular communication session, which in turn triggers the conveyance of the offer 245 to the user.

The offer 245 can be conveyed in a number of ways, the invention not being limited to a particular form of conveyance. In a non-limiting example, the offer 245 is conveyed to the user via a graphical user interface at computer 110. The graphical user interface may comprise a plurality of display components such as icons, cursors, roll-down menus and visual panes. A number of different exemplary forms of conveyance will be described herein with reference to FIGS. 4-7. Generally throughout, a first display component of the graphical user interface is indicative of the availability of the at least one alternative service level for the particular communication session. This first display component does not need to convey any additional details other than the fact that there is at least one available alternative service level. A selection tool allows the user to indicate an acceptance of the offer for causing a change in the service level associated with the particular communication session to one of the at least one alternative service level. The selection tool may include a visual component and is user controllable through a user input device such as a keyboard, mouse or touch-screen. The selection tool can include clickable controls, such as buttons, radio buttons and check boxes. For example, the at least one alternative service level may be a single alternative service level and the selection tool may comprise a single "accept" button, clickable with a user-operated pointing device (e.g. a mouse). The clicking of the accept button may cause a change in the service level associated with the particular communication session to the single alternative service level. In other examples, the at least one alternative service level may comprise a plurality of alternative service levels. Optionally, a second display component of the graphical user interface displays information indicative of the specific at least one alternative service level, as will be described in more detail below. The second display component can but does not need to be displayed simultaneously with the first display component.

Figure 4:
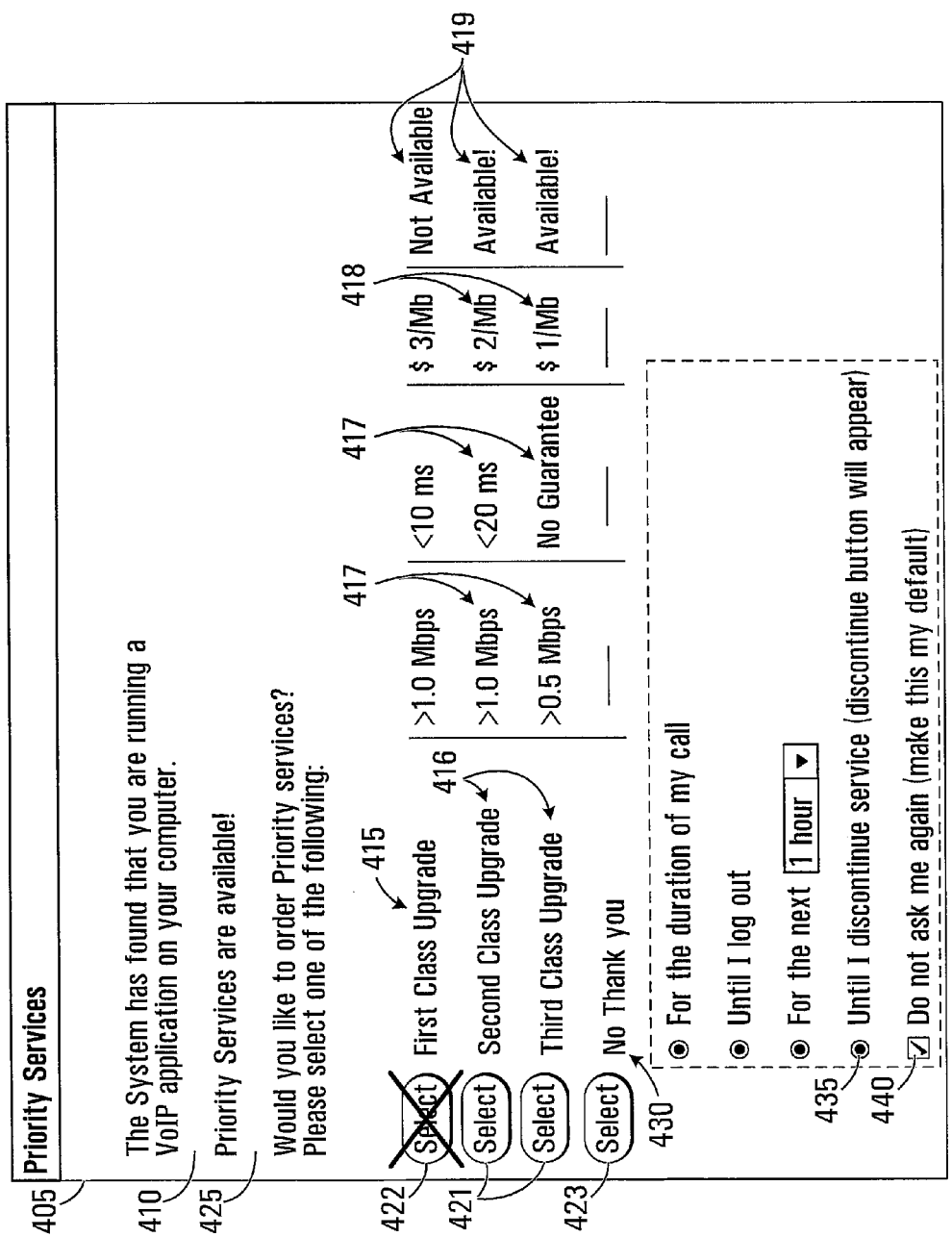
FIG. 4 shows a pop-up window conveying an offer in accordance with a non-limiting embodiment.

In a first specific embodiment of the present invention, illustrated in FIG. 4, a first display component 410, a second display component 415 and a selection tool 420 appear in a pop-up window 405 presented to the user at computer 110. The first display component 410, second display component 415 and selection tool 420 may be displayed simultaneously. In this example, the pop-up window also comprises a duration selector 435 and a default-condition selector 440. The pop-up window 405 can be implemented using any suitable means. The display of the pop-up window 405 is triggered by the server 120, however the manner in which it is implemented may vary according to the embodiment. For example, the pop-up window 405 can be implemented using as a web page shown in an instance of a web-browser window. If the network connectivity application 205 is a web-based application running from a web server, code describing the content of the pop-up window may be stored on the web server. In this particular case, the server 120 may cause the display of the pop-up window 405 by sending the web server a command to cause the display of pop-up window 405. Alternatively, the display of the pop-up window 405 may be caused by another entity such as a network device (e.g. a server) belonging to an operator of the data network 115. This network device may cause the display of the pop-up window 405 upon receipt of a command from the server 120. Alternatively, if the network connectivity application 205 comprises a peer-to-peer software running on computer 110, the peer-to-peer software may be programmed to cause the display of the pop-up window 405 responsive to the receipt of a command from the server 120. In both these cases, the server 120 may send, along with the command to display the pop-up window 405, details on the content of the window, such as identification of the at least one alternative service level.

The first display component 410 is a first visual pane 425 that comprises a textual message explaining that "priority services are available".

The second display component 415 comprises a second visual pane 430 displayed simultaneously and adjacently to the first visual pane 420 in the pop-up window 405.

No particular outlines or delimitations mark the boundaries of the first and second visual panes 425, 430 in this example, although these could be visually delimited in actuality. The second visual pane 430 comprises identifiers 416, including one for each of the at least one alternative service level. Generally, in this embodiment, there are assumed to exist three possible service levels to which, if they are available, a given communication session may be upgraded. There is a "first class upgrade", a "second class upgrade" and a "third class upgrade". However, in the specific example shown in FIG. 4, only two of these are available (the "first class upgrade" is not available), and thus there are only two alternative service levels identified using the identifiers 416, to which the particular communication session may be upgraded.

In addition to the identifiers 416, the second visual pane 430 also comprises indicators 417, one for each of the alternative service levels, of an improvement associated with the alternative service levels. In this particular case, the improvement includes an improved maximum bandwidth for the particular communication session and may include a guaranteed maximum average jitter (not for the third class upgrade), both of which are presented by indicators 417 for each alternative service level. Of course many other measures of improvements may be used and the indicators 417 may vary accordingly. Alternatively, or in addition, indicators 417 may provide a visual cue for a degree of improvement, not necessarily related to a specific measurement. For example, the indicators 417 may use a scale on which the various alternative service levels are represented to represent the perceivable improvement each alternative service level may bring about.

The second visual pane 430 also comprises price tags 418 indicative of the price of a change to each of the alternative service levels, as determined by the service level analysis module 225 in the manner described above. In this particular example, the price displayed is a price per quantity of data. In addition to comprising identifiers 416, indicators 417 and price tags 418 for describing each of the at least one alternative service levels, in this example the service levels that are not available (in this case the "first class upgrade") are also shown along with performance and price details. For clarity, availability tokens 419 are shown next to each of the displayed service levels to indicate which ones are available.

In the example shown here, the selection tool 420 comprises a plurality of clickable buttons 421, one for each of the alternative service levels. For illustrative purposes, an icon 422 of the likeness of buttons 421 but crossed out is shown alongside the "first class upgrade" which is not an available service level. An additional rejection button 423 is provided for receiving input indicative of a rejection of the offer 245. The user can provide input via the selection tool 420 indicative of an acceptance of the offer 245 by selecting an alternative service level by clicking on the button 421 corresponding to the desired alternative service level. Thus in this example, by selecting an alternative service level, the user accepts the offer. The acceptance of the offer 245 is communicated back to the server 120 via response 250, shown in FIG. 2, which comprises an indication 251 the selected service level.

The user can reject the offer 245 by clicking on the rejection button 423. If the user rejects the offer 245, a rejection message may be communicated to the server 120 in the same manner as the response 250. Alternatively, the rejection of the offer 245 may be communicated by the absence of the response 250. Optionally, the user may simply ignore the offer 245 in order to reject it. In this case, the server 120 waits a given amount of time for a response, and if the given amount of time runs out and no response has been received, the server 120 assumes that the offer 245 was rejected. Also in this case, the pop-up window 405 may be removed after a certain amount of time runs out. Removing the pop-up window 405 may be caused by an external command such as a command from the server 120 (or from a web server or any other device that caused the display of the pop-up window 405) or may be caused by a local command upon the expiry of a local countdown.

The selection tool 420 is shown here as separate from the second display component 415; however it should be understood that the selection tool 420 may be within the second display component 415 and that these two may overlap. For example, the example shown in FIG. 4 could be modified such that the words "second class upgrade" and "third class upgrade" are also clickable links, such as Uniform Resource Locators (URLs), for selecting the corresponding alternative service level. In this case, the portion of the second display component 415 that make up these words would also embody the selection tool 420.

In the particular embodiment shown in FIG. 4, the pop-up window 405 also comprises the duration selector 435, which permits the user to select the time frame for which a selected service level is to be maintained. The duration selector 435 can be implemented using any suitable graphical user interface component, and in the example shown, the duration selector 435 comprises a plurality of radio buttons, each corresponding to a different option for the time frame. Here, the first option is the duration of an ongoing VoIP telephone call. The second option is duration of the connection, at computer 110, to the data network 115. The third option is a variable fixed-time option, where a pull-down menu allows the user to select a fixed number of hours (or minutes). The fourth option, if selected, causes a discontinue button to appear, e.g. in a pop-under window, whereby the time frame ends when the user clicks on the discontinue button.

The default-condition selector 440 allows the user to set the selection made with the duration selector 435 as his/her "default". It is implemented in this non-limiting example as a check box which, if checked, indicates that the user does not wish to be presented with the duration selector 435 in any potential future offers, but that the same time frame should be assumed for all potential future solicited offers that the user may accept in the future. As a result, potential future unsolicited doffers may be presented in simpler pop-up windows, absent the duration selector 435 and default-condition selector 440. Alternatively or additionally, checking the check box may indicate that a selected alternative service level is to be set as a default preference and that the service level for a session should always be upgraded to this service level if available.

Figure 5A:
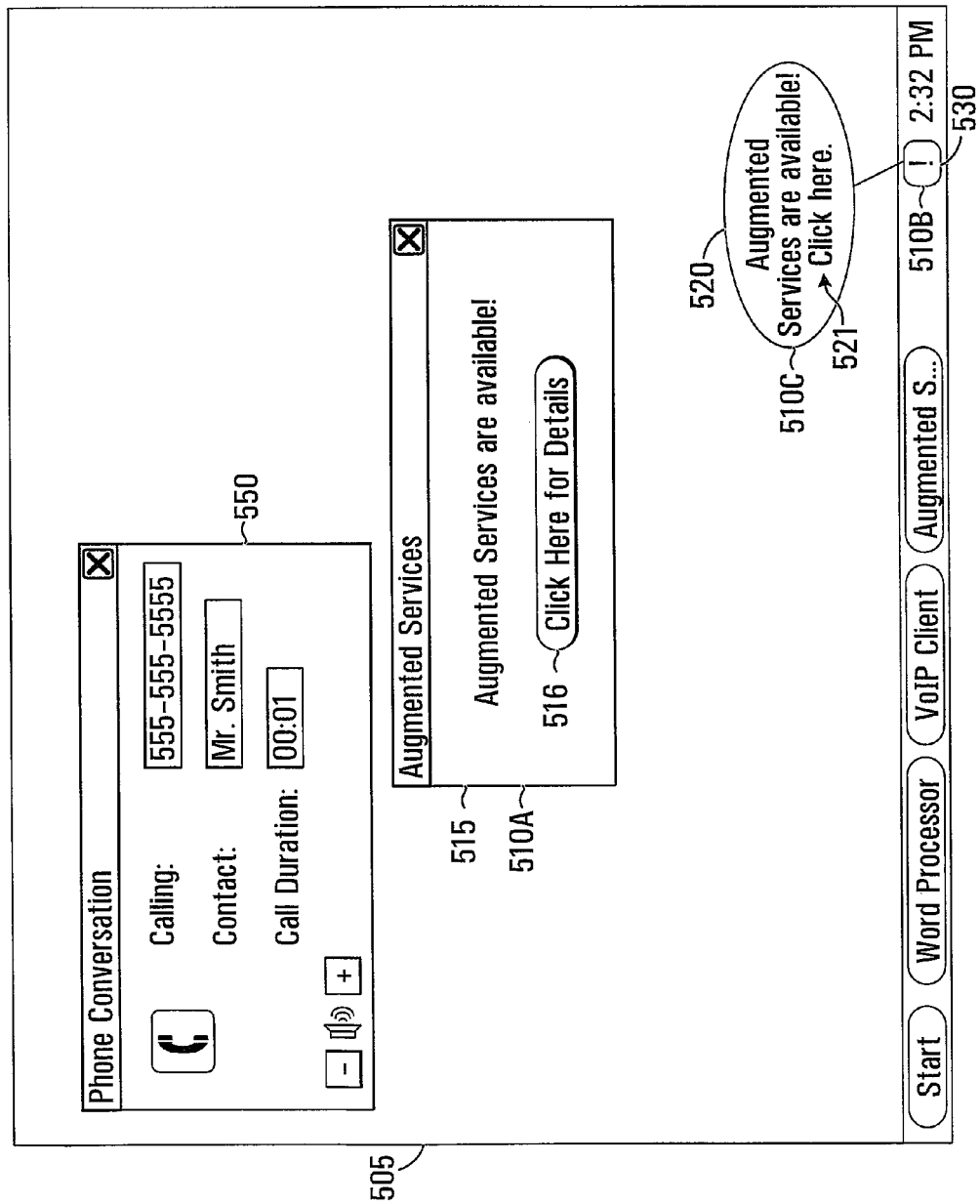
FIG. 5A shows a visual computing environment displaying a first display component in accordance with another non-limiting embodiment.
Figure 5B:
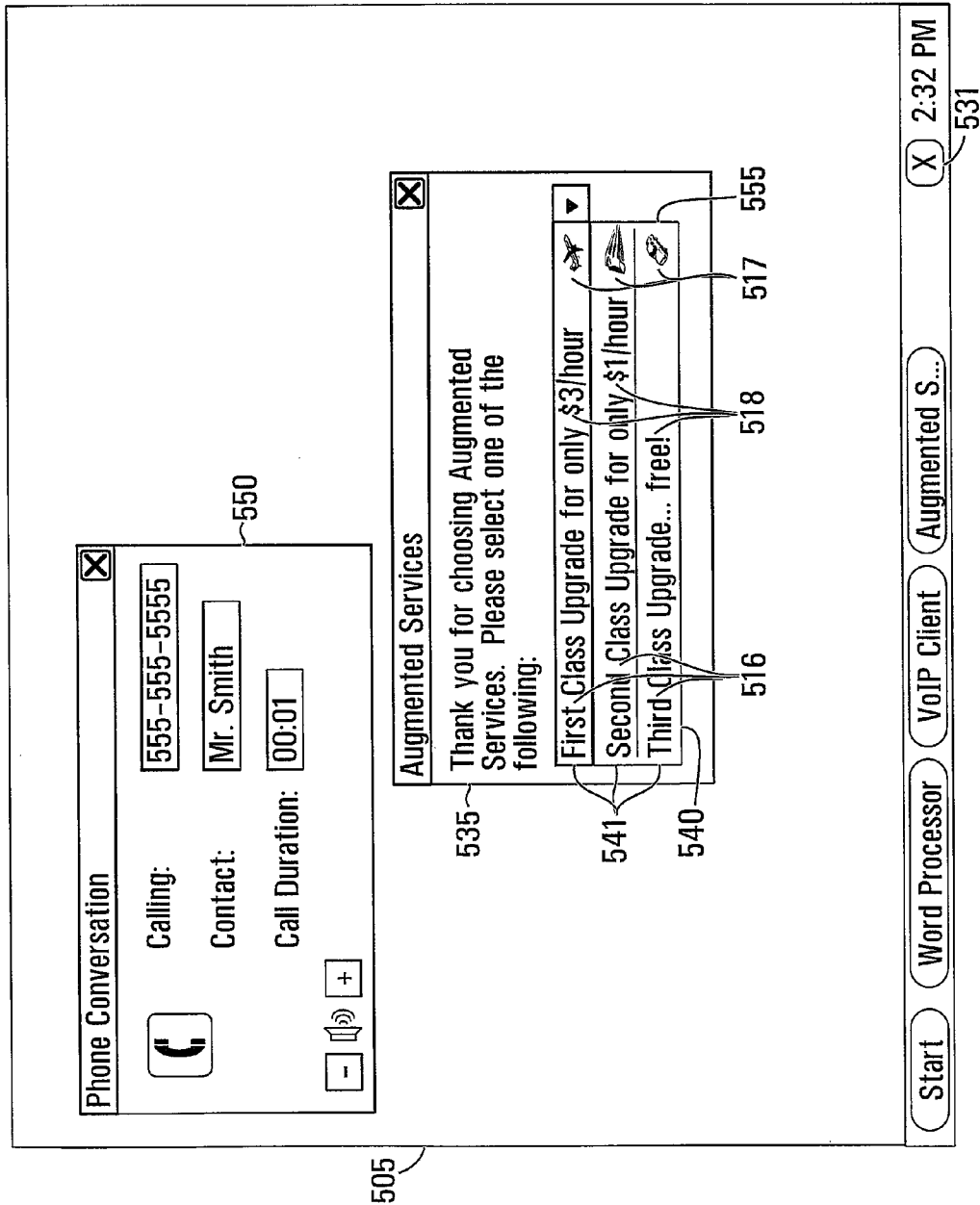
FIG. 5B shows the visual computing environment of FIG. 5A displaying a second display component.

A second specific embodiment of the present invention is illustrated in FIGS. 5A and 5B. In this example, the network connectivity application 205 is specifically a VoIP client running on computer 110. The VoIP client commands a VoIP interface window 550 that is displayed within a visual computing environment 505 of computer 110. As shown here, a VoIP call is being initiated by calling out from the VoIP client, although the following description applies also to actions taken in response to reception of an incoming VoIP call. As shown in FIG. 5A, as the call is being initiated, the user receives an offer. Here the offer is conveyed in three different ways, each of which involving a respective initial display component 510a, 510b and 510c. No information regarding the at least one alternative service level is displayed by the initial display components 510a, 510b and 510c. Rather, the offer begins with a query inviting the user to indicate an interest in a change of service level. More specifically, Initial display component 510a comprises an initial pop-up window 515 which in this case is a visual pane as in the previous example, and which displays a textual message indicative of an availability of at least one alternative service level. A clickable control in the form of a button 516 is presented for allowing the user to cause a subsequent display component (shown in FIG. 5B) to be displayed.

Initial display component 510b comprises an icon 530 in a task bar. The icon 530 may appear simultaneously with the initial pop-up window 515. The icon 530 can be designed to be recognizable by the user as indicative of the availability of at least one alternative service level. Clicking on the icon 530 also causes the subsequent display component (see FIG. 5B) to be displayed.

Initial display component 510c comprises a talk-bubble 520 that may appear above the icon 530 for a preset period of time. The talk-bubble 520 comprises a textual clickable control 521 (e.g. a link) that allows the user to cause the subsequent display component (see FIG. 5B) to be displayed.

To reject the offer, the user can close the pop-up window 515 while ignoring the talk bubble 520 and the icon 530. However, to view the subsequent display component, the user can click on the button 516, icon 530 or link 521. In response to any of these actions, the subsequent display component 545 appear which, with reference to FIG. 5B, can be in the form of a subsequent pop-up window 535. The initial pop-up window 515 and the talk-bubble 520 may disappear. The subsequent pop-up window 535 comprises a pull-down menu 540. The pull-down menu 540 comprises a plurality of entries 541, one for each alternative service level. Each of the entries 541 comprises an identifier 516 of the service level it corresponds to, a price tag 518 (which in this example is indicative of a price per hour), and an indication 517 of the improvement associated with the alternative service level (which here is a pictogram). Besides embodying the second display component 415, the pull-down menu 540 also serves as a selection tool 555 by allowing the user to select an alternative service level from the menu 540. In this non-limiting example, the VoIP client is programmed to cause the display of initial display components 510a, 510b, 510c in response to the receipt of a command from the server 120. The software is also programmed to detect clicking on the button 516, icon 530 or link 521 and, in response, to cause the display of the subsequent pop-up window 535. Alternatively, the software could report the clicking on the button 516, icon 530 or link 521 to the server 120 and cause the display of the subsequent pop-up window 535 only in response to the receipt of a subsequent command from the server 120. In another embodiment, the pop-up window 515 may be an instance of a web browser window displaying a web page. In this embodiment, clicking on the button 516, icon 530 or link 521 may be reported back, by conventional means, to the web server hosting the web page. The web browser may then cause the subsequent pop-up window 535 to be displayed to the user, for example as a web page in a new web browser window or as a new web page in the same web browser window.

In this example, upon selection of an alternative service level, a termination button 531 may appear, which may take the place of the icon 530. Here, the price applies for the duration of the particular communication session; however the price being a per-quantity of time price, the user can elect to terminate the service level upgrade at any time by clicking on the termination button 531. Doing so will cause the service level associated with the particular communication session to return to what it was prior to the acceptance of the offer. The termination button 531 can be located elsewhere than on the task bar (such as on a window that stays open in the background) and indeed can be substituted by any other suitable graphical user interface control.

Figure 6:
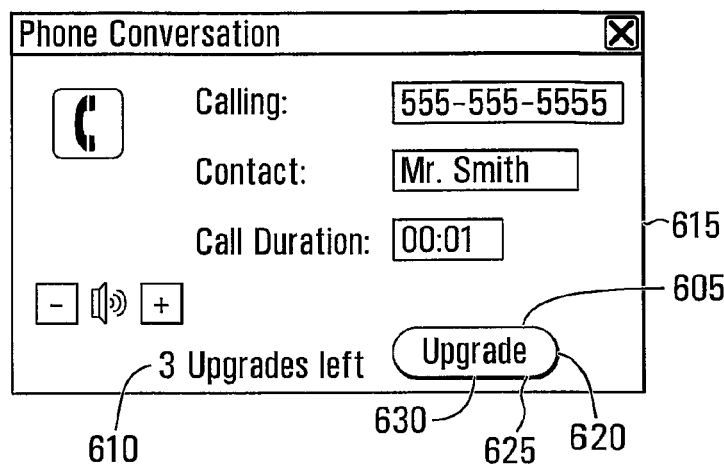
FIG. 6 shows a VoIP interface window in accordance with another non-limiting embodiment.

Yet another specific embodiment of the present invention is illustrated in FIG. 6. As in the previous example, here the connectivity application is a VoIP client running on computer 110. As in the previous example, the VoIP client commands a VoIP interface window 615 that is displayed within the visual computing environment of computer 110. In this example, there is only one possible alternative service level, namely an "upgraded quality of service". When it is determined that the upgraded quality of service is available, the conveyance of the offer is performed by the displaying of an upgrade button 605 in the VoIP interface window 615. The upgrade button 605 embodies a first display component 620 and is indicative of availability of the upgraded quality of service. The upgrade button 605 also embodies a second display component 625. The upgrade button 605 is recognizable as being associated with the higher service level of the upgraded quality of service and is thus indicative of the alternative service level. Simultaneously, the upgrade button 605 serves as a selection tool 630, selection of the upgraded quality of service being performed by clicking the upgrade button 605.

In this embodiment, the customer is assumed to have been allocated a number of "upgrade credits". In this example, the upgrade credits are associated with the customer (or with an account associated with the customer) and represent a number of instances of upgrades available to the customer. A visual display component, in this case a textual cue 610, indicates the number of upgrade credits. If each upgrade credit can be applied to one instance of a service level upgrade, it is apparent that by accepting the offer, the number of upgrade credits will decrease by one. In a more complex scenario, if several alternative service levels existed, however, the number of upgrade credits required could depend on the difference between the current service level and the selected service level. In such a case, a price tag may be displayed indicating the number of upgrade credits required for each alternative service level. Upgrade credits do not necessarily need to be associated with the customer and could be, for example, associated more specifically with a particular user of computer 110, such user being identifiable by user credentials such a username and password. Upgrade credits may be purchased by a user in advance or may be pre-allocated to each customer, e.g., in numbers depending on the account type. Upgrade credits may substitute currency pricing or may combined therewith, currency pricing being usable when no upgrade credits are available.

Figure 7:
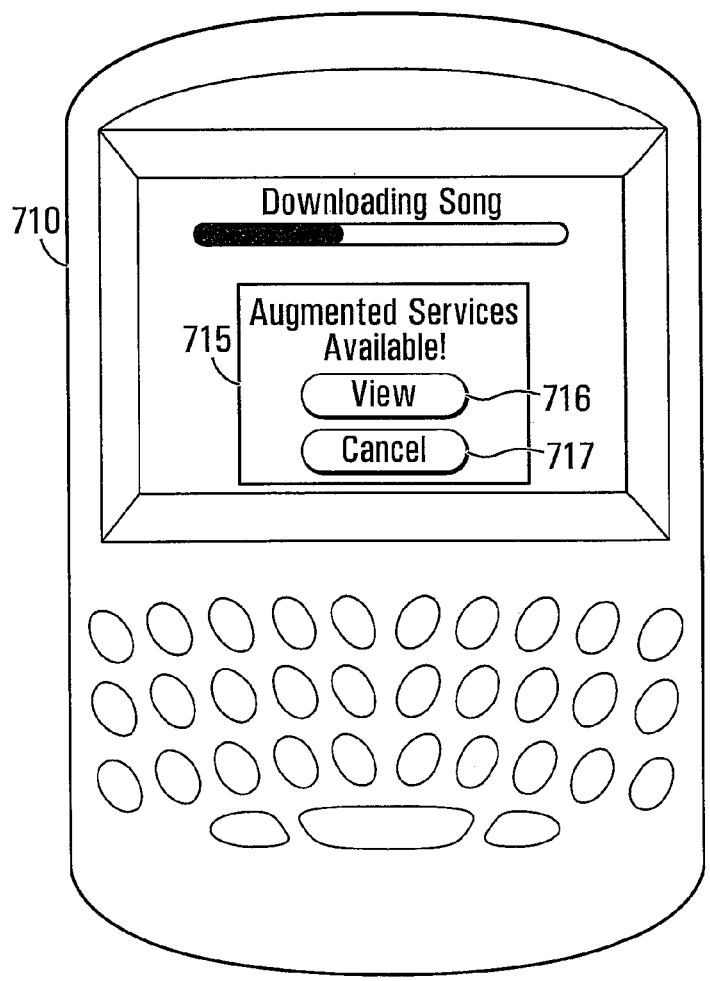
FIG. 7 shows a cellular telephone in accordance with another non-limiting embodiment.

FIG. 7 illustrates yet another specific embodiment of the present invention where the network communication device is a cellular telephone 710. In this example, the data network 115 includes cellular telephone towers and the communication link between the network access device and the data network 115 is not a fixed line but a dynamic connection between cellular telephone 710 and the various towers. The customer here is associated with a cellular network access account and a unique telephone number.

Let it be assumed for the purposes of this example that the user of the cellular telephone 710 is downloading a song onto the cellular telephone 710 when it is determined that an alternative service level is available. In this case, the service level analysis module 225 may have determined that an increased level of service was available on the basis of network utilization data from which it determined that the cellular telephone 710 had entered an area of the data network 115 where the increased service level is supported. An offer is conveyed to the user via a first display component which in this example is a pop-up window 715 similar to the first pop-up window 515 of the example shown in FIG. 5A. Analogously, a button 716 similar to button 516 allows the user to cause a further display component to be displayed in order to present to the user a choice of the at least one alternative service level. Display of the further display component can be done in any suitable manner, such as in the manner shown in FIG. 5B, and will not be discussed in further detail. A cancel button 717 allows the user to reject the offer and close the pop-up window 715.

Figure 8:
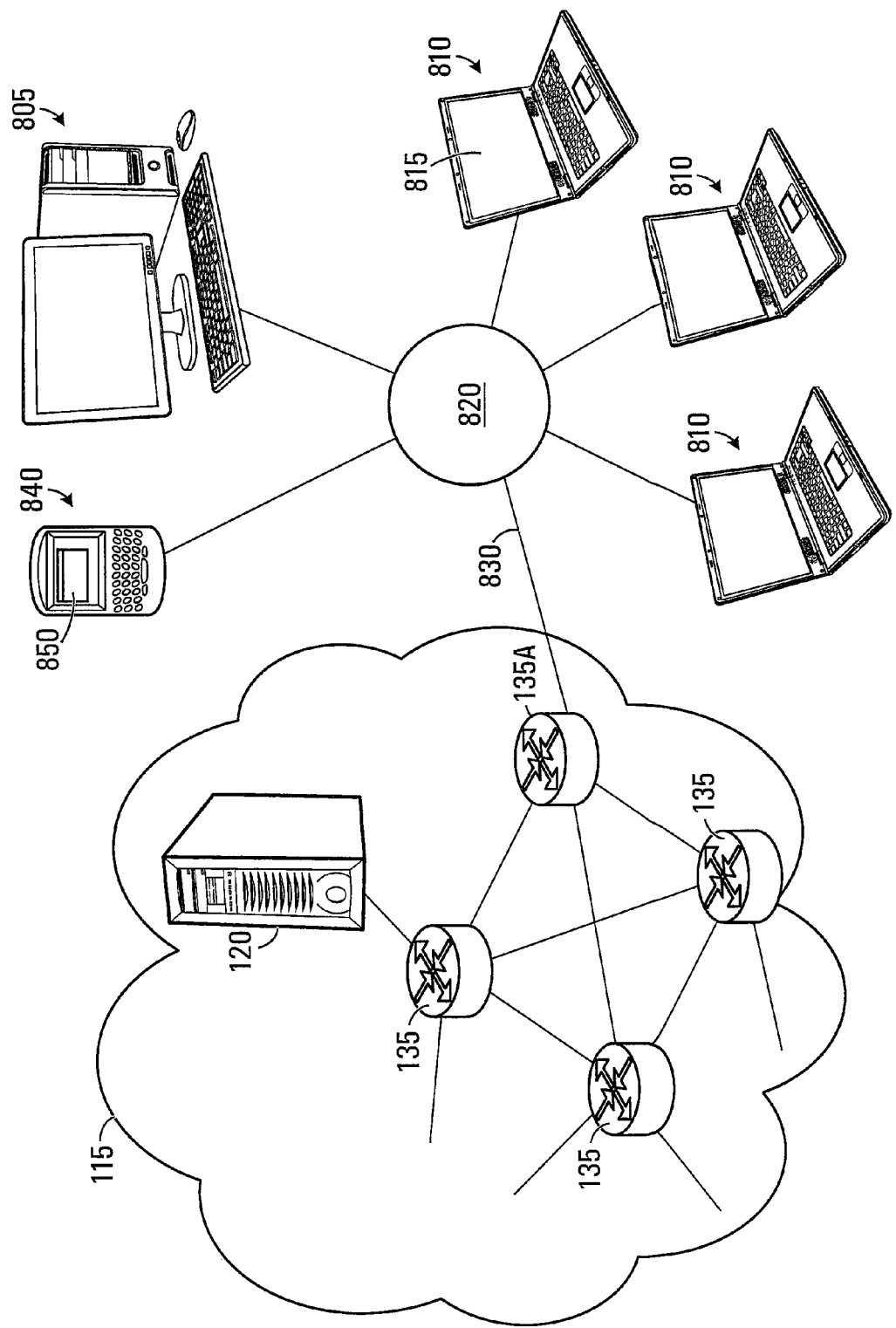
FIG. 8 shows a network architecture in accordance with another non-limiting embodiment.

Another embodiment is provided in FIG. 8. Here the customer is a business network access service customer having an internal network 820 connected to the data network 115 via communication link 830. Interconnected by the internal network 820 are various computers 810 including a particular computer 815 at which a user is involved in a communication session. Also connected to the internal network 820 is a management computer 805 used by a technician. The server 120 determines that a higher service level is available for the communication session. Unlike in the above examples, the offer to select an alternate quality of service is conveyed not to the user at computer 815, but to the technician at management computer 805. To this end, the customer database 221 in the network monitoring module 220 of the server 120 comprises, for each customer, an indication of a designated receiver of offers destined for that customer. In this particular example, an e-mail address of the technician is stored in customer database 221. When the service level analysis module 225 identifies one or more alternative service levels for the communication session involving a user at any one of computers 810, an offer to select an alternative service level is sent in an e-mail message, as shown in FIG. 9, to the technician at management computer 805. To this end, the communication processing entity 230 of the server 120 includes an e-mail function for generating and transmitting e-mail messages.

An exemplary e-mail message 905 is shown in FIG. 9. The e-mail message 905 includes an indicator 910 that at least one alternative service level is available and a presentation 915 of the at least one alternative service level. The technician is assumed to be the designated receiver of offers for all users at all computers 810 on the internal network 820 and the e-mail message 905 includes a list 920 of the users involved in communication sessions for which alternative service levels are available (in this case two users). The presentation 915 comprises a plurality of options 916 including a first option 930, a second option 935 and a third option 940. For the purposes of this example, it is assumed that only one alternative service level exists, the "High-Speed Service", however more service levels could of course be offered.

The first option 930 suggests upgrading the communication sessions of both users listed in list 920 to the "High-Speed Service". Included with the first option 930 are instructions 931 on how to accept the offer and select the first option 930. In this example, a reply e-mail with "Option 1" in the subject line will be received at the communication processing entity 230 of the server 120 and be understood as indicative of an acceptance of the offer and selection of the first option 930. A link 932 (in this case, a URL) is also provided with the instructions 931 as an alternative way of communicating acceptance of the offer and selection of the first option 930.

As a second option 935, the offer includes the possibility of upgrading every one of a certain type of communication session (in this case, teleconferences), for a period of time such as the current day. Here too, instructions are provided with the second option 935. This is of course just an exemplary option and many other options are possible. For example the time frame for the upgrade could be changed. Furthermore an upgrade could be offered only for selected communication sessions.

Options 916 may also feature different services for different users in list 920, and in this case a third option 940 invites the technician to follow a link to a web site from which more detailed selection of service level is possible. For example, it may be possible, on the web site, for the technician to set the service level for specific communication sessions or users.

Returning to FIG. 8, if the technician at management computer 805 does not respond to an offer when conveyed, the server 120 conveys the offer a second time but in the form of an SMS message 850 to a cellular telephone 840. The cellular telephone number is stored in the customer database 221, as is the offer-conveyance procedure (i.e. "first send to the computer 805 by e-mail, then to the technician's cellular telephone 840"). Communication processing entity 230 of the server 120 can communicate with a cellular telephone network interface to cause the SMS message 850 to be transmitted to the cellular telephone 840. The SMS message 850 may have a similar format to e-mail 905, including instructions to reply with a selected option in the text and/or a URL to follow to select an option.

Although in this example the offer was conveyed via an e-mail message and a text message, any other suitable way of conveying the offer can be used. For example, the offer can be conveyed via an instant messaging (IM) service. To this end, an instant messaging entity such as a computer software application configured to communicate with humans by instant messaging (e.g. an instant messaging robot or "IM bot") may be employed to convey the offer. The instant messaging entity can be implemented in any suitable manner and may, for example, be embodied by the server 120 if the communication processing entity 230 is configured to send instant messages. Alternatively the instant messaging entity may be separate from the server 120, and the server 120 can cause the conveyance of the offer via instant messaging by sending commands to the instant messaging entity, which in turn causes the instant messaging entity to convey the offer via instant messaging.

In any of the above embodiments where the offer is accepted and the selected alternative service level has a corresponding price, the server 120 may cause the price associated with the selected alternative service level to be charged to a purchaser. The purchaser may be any entity that can be charged and any suitable mechanism for charging the purchaser may be used:

- In one example, the purchaser is the customer and is associated with a particular account, for example an account in which fees for access to the data network 115 or fees related to the connectivity application 205, or both, are debited. The price associated with the selected alternative service level is debited from the customer's account.
- Alternatively, the purchaser may be the user (or another individual, such as the technician referred to above). A financial transaction involving the user (or technician) may be initiated upon acceptance of the offer. The financial transaction can be undertaken by any suitable method and can be a web-based payment such as a web credit card payment, a PayPal payment or any electronic fund transfer.
- In the case where upgrade credits are used, the transaction may simply involve debiting an upgrade credit account by an appropriate number of upgrade credits. The purchaser may be any entity associated with the upgrade credits.

Those skilled in the art should appreciate that there are various ways in which to cause the change in the service level for the particular communication session to the selected alternative service level which may vary depending on the implementation of the data network 115. In one embodiment, the server 120 sends service level instructions 255 to network equipment instructing the network equipment to process data associated with the particular communication session in a manner that reflects the selected alternative service level. For example:

- Routers 135 may be specifically instructed to identify data associated with the particular communication session and to treat it in a manner reflective of the selected alternative service level. For example, routers 135, or certain routers from among routers 135, may be instructed to route data associated with the particular communication session over a particular communication link within the data network 115.
- Alternatively, the network access component 105 may be instructed to process the data associated with the particular communication session in a specific manner. In one example, the network access component 105 is instructed to associate a particular service level identifier with data associated to the particular communication session being transmitted from the computer 110 over the data network 115 (e.g. to insert or overwrite a Diff-Serv value in packets associated with the particular communication session). Routers 135 forwarding the data towards its destination recognize the identifier as being associated with the selected alternative service level and process the data in accordance therewith.
- Alternatively still, the network connectivity application 205, which generates data associated with the particular communication session, is instructed to associate the particular service level identifier with the data being generated.
- In yet another example, customer network access settings associated with the customer are changed to reflect the selected alternative service level. For example, a bandwidth allocation for the communication link 130 may be changed, e.g., to increase to a customer bandwidth allocation associated with the selected alternative service level. Alternatively, "choking" (bandwidth limiting) of a particular type of connectivity service such as P2P services could be deactivated for the customer.

A given service level may be achieved by the data network 115 on a packet-by-packet basis. For example, packets may carry a service level identifier, such as a DiffServ value, described above, indicating the service level according to which they are to be treated. As such, in a packet-based environment, causing a change in the service level associated with the particular communication session to a selected service level may be achieved by associating individual packets associated with the communication session to the selected service level. Alternatively, the given service level may be achieved by other means, and in a circuit-switched (or partially circuit-switched) network, the service level could be achieved by transferring the particular communication session to (or establishing it over) a circuit corresponding to the given service level.

While the invention has been described here with reference to specific examples, it should be understood that this has been for the purposes of illustrating, not limiting, the invention. Many variations will be readily apparent to one skilled in the art.

For example, it should be understood that the data network 115 does not necessarily need to be an IP network as shown here and can take the form of other communication arrangements. The data network 115 could comprise circuit-switched portions and/or packet switched portions and could include one or many sub-networks.

While the network access component 105 has been shown here as a broadband modem, physically separate from the computer 110, it is to be appreciated that the network access component 105 may be any component that provides access to data network 115 and may be within the network communication device (computer 110 or other network communication device, as the case may be). In such a case, Ethernet connection 125 may be absent.

It should also be understood that communication link 130, can, but does not need to be, a physical connection, e.g. a cable or wireless connection. Communication link 130 may also be a logical link such as may be provided, for example, by the use of a special identifier to distinguish data belonging to communication link 130 from amongst other data using a same physical communication link.

It should also be appreciated that while service levels have been generally described as being valued on a scale with certain service levels being higher than others, the difference in service at different service levels may be such that certain different service levels do not have a clear rank and that individual preferences or particular aspects of the communication session determine a preferred service level. For example, if one service level offers guaranteed transmission while another offers faster transmission with no guarantees, it may not be immediately apparent which service level is "higher", and the valuation of the better service level may depend upon a user's particular requirements for a particular communication session.

Furthermore, while the above examples have illustrated offers for improved service level(s), including at a cost, it is to be understood that an offer can be for lower service level. For example, when the network monitoring module 220 determines that the data network 115 is overloaded, an offer may be sent to a user of a connectivity application for a lowered service level. In this case, the price associated with the change in service level may be a negative price such as a payment (e.g. electronic fund transfer or PayPal payment), refund (e.g. credit an account), credit (e.g. a quantity of "upgrade credits" or other manner of offering future service level upgrades) or discount (e.g. price reduction on other services or goods). A negative price can be expressed in any of the ways described above in the discussion pertaining to (positive) pricing, on in any combination thereof, including a price per quantity of time, price per quantity of data and price per communication session. A negative price can be indicated by a price tag. Furthermore, when an offered alternative service level is a lower service level, an indicator of a deterioration associated with the alternative service level may be displayed, e.g. to the user. The deterioration can be indicated by any suitable measure or in any suitable way, including any of the measures and ways provided above for indicators of improvements (e.g. indicator 417 and indicator 517). By sending offers to lower service level, the server 120 can potentially prevent or resolve overloading of the data network 115.

In a non-limiting example, when the network utilization data 325 indicates that the network utilization has risen to a certain threshold (the network utilization data 325 may have been sent responsive to the network management server 305 detecting that the network utilization has indeed risen to the certain threshold), the server 120 may cause the conveyance of an offer (or many offers) of an alternative service level the acceptance of which would cause a downgrade in service level. This offer may be associated with a discount, credit, refund or other negative payment to be applied in response to the acceptance of the offer. In this example, after identifying the particular communication session and the service level associated with it, the network monitoring module 220 determines an availability of network resources in the same manner as described above. It is to be understood that the availability of network resources determined by the network monitoring module 220 may be nil if, for example, the network utilization has reached a maximum and no more network resources are available. The service level analysis module 225 identifies at least one alternative service level for the particular communication session, but this at least one alternative service level comprises at least one alternative service level that is lower than the service level currently associated with the particular communication session. Identification of a lower service level may be done in any manner described above, or in any manner analogous thereto. For example, instead of discarding service levels below the current service level associated with the particular communication session, the service level analysis module may discard service levels above the current service level associated with the particular communication session. The service level analysis module may then determine a negative price, for example using the pricing information database 226. A negative price can be calculated in any manner described above or in any manner analogous thereto. For example, the negative price may be a discount that depends upon the availability of network resources, where the value of the discount increases as the availability of network resources decreases.

Thus, the server 120 may convey an offer of a choice of a lowered service level (representing a downgrade from the current service level associated with the particular communication session to a lower service level) at a negative price. It is to be understood that the offer may include a choice of many alternative service levels any number of which may represent a downgrade or an upgrade in service level. A choice of one or more alternative service level(s) representing a downgrade in service level can be offered alongside a choice of one or more alternative service level(s) representing an upgrade in service level in a same offer. Likewise choice of one or more alternative service level(s) associated with a negative price can be offered alongside a choice of one or more alternative service level(s) associated with a "positive" price (i.e., a "price" in a more traditional sense) in a same offer.

Although the network utilization data 325 has been assumed to be representative of the utilization of the entire data network 115, it should be understood that the network utilization data 325 may comprise information on one or more subsets of the data network 115. For example, the data network 115 may be broken down by geographical regions (such as by regions served by individual Digital Subscriber Line Access Multiplexers, DSLAMs), and the network utilization data 325 may include information indicative of network utilization within one, many, or all such geographical regions. Alternatively the data network 115 may be broken down into subsets according to any other (i.e. non-geographical) criteria and the network utilization data 325 may include information indicative of the network utilization within one, many, or all such subsets. For example, the network utilization data may include information indicative of network utilization by a first class of customers (such as customers of a carrier that operates the data network 115) and information indicative of network utilization by a second class of customers (such as customers accessing the data network 115 from a partner network operated by a different carrier). In a non-limiting example, the network utilization data 325 comprises information on one or more subsets of the data network 115 and may include any of the information described previously (e.g. a threshold of utilization reached) for each of the one or more subsets of the data network 115. In this example, the network monitoring module 220 may determine the availability of network resources for each of (or at least one of) the one or more subsets of the data network 115 separately, for example in any manner described earlier. Still in this example, when the network monitoring module 220 identifies the particular communication session, it also may identify a particular subset of the data network 115 with which the particular communication session is associated. This may be done, for example on the basis of the geographical location of the network access component 105, on the bases of a particular unique identifier (such as an IP address, telephone number, or SIP ID), or on any other basis. Alternatively, determination of the particular subset with which the particular communication session is associated may be done by the service level analysis module 225. The service level analysis module 225 may determine the at least one alternative service level for the communication session on the basis of an availability of network resources for the particular subset with which the particular communication session is associated.

Although in the example described above, the customer network usage data 315 was received from the network access component 105, it should be understood that this is only one possible implementation and that the customer network usage data 315 may originate elsewhere. For example, the customer network usage data 315 may be sent to the server 120 by the computer 110 (via the network access component 105) or it may be compiled by other network equipment within the data network 115 and sent to the server 120 therefrom. For example, an entry point in the network to which the network access component 105 is directly connected may record network usage over communication link 130 and communicate the recorded customer network usage to the server 120.

Furthermore, although in the examples provided the customer subscribes to network access service, it should be understood that the customer may subscribe to other services such as connectivity services provided using the network connectivity application 205 (e.g. VoIP services or gaming services). Accordingly, the customer may not necessarily be associated with the communication link 130, but may be associated with a customer account identifier, such as a VoIP account number. The server 120 may identify customers by any suitable means such as by Session Initiation Protocol identifiers (SIP IDs) or gaming service account numbers, and the customer database 221 may be adapted to contain any necessary data (e.g. the SIP IDs or gaming service account numbers). In this case, the customer network usage 315, instead of identifying network usage over a communication link, identifies usage of the particular service to which the customer subscribes. For example, the customer network usage 315 might identify usage of a certain VoIP or gaining account, and be sent to the server 120 directly by a VoIP telephone or gaming client or server.

Although in the example described in connection with FIG. 3, the network utilization data 325 has been obtained from the network management server 305, it should be understood that this is only one possible manner of determining the level of network utilization, the invention not being limited to any particular manner of doing so. For example, the network monitoring module 220 may directly poll network devices to obtain the individual level of occupancy of each polled network device.

In an alternate embodiment, a specific communication of the customer network usage data 315 is not necessary to identify a communication session over the communication link 130. Rather, the network utilization data 325 comprises detailed information on traffic within the data network 115, including identification of individual active communication sessions. If the network utilization data 325 is received from the network management server 305, for example, the network utilization data 325 may include identification of all the active communication sessions in the data network 115 and the customers associated with them. With this information, the server 120 can track the individual communication sessions within in the data network 115 and does not need to receive the customer network usage data 315 from the network access component 105 to identify a communication session and/or an associated priority level. Alternatively, in an embodiment where network devices are polled directly to receive their individual level of occupancy, each polled network device may provide the network monitoring module 220 with detailed information as to the traffic it supports, including identification of individual communication sessions supported and corresponding communication links or customer IDs. Here too, this data may be used in lieu of the customer network usage data 315 to identify the particular communication session.

Also, while the network monitoring module 220 may derive an availability of network resources from the network utilization data 325 as described, it is to be appreciated that the availability of network resources may be provided to the server 120 within the network utilization data 325 such that deriving the availability of network resources merely requires observation of the network utilization data 325.

Furthermore, the network management server 305 is shown in FIG. 3 as separate from the sever 120; however it is to be understood that the network management server 305 and the server 120 may be combined. For example, embodiments of the present invention may be implemented in a data network that already has a particular network management server, by supplementing the particular network management server with the functionality of the server 120 described herein.

The service level analysis module 225 is described above in accordance with an exemplary embodiment, but it should be appreciated that many methods other than the ones described can be used to identify the at least one alternative service level. For example, the service level analysis module 225 may not have access to the availability of network resources and may have to extrapolate which service level changes can be supported by the data network 115 based on the level of network utilization. Alternatively, the service level analysis module 225 may assume a certain availability of network resources based on external factors such as time of day and/or day of the week. Alternatively still, the service level analysis module 225 may determine the at least one alternative service level uniquely based on information on the particular communication session and the service level associated therewith. In such a case, the service level analysis module 225 may apply universal rules as to which communication sessions may undergo a change in service level (e.g. "all VoIP calls between two customers connected to the data network 115 can be upgraded to a certain service level").

Still other variations may fall within the scope of the invention, which is defined in the appended claims.

The invention claimed is:

1. A method comprising the steps of:
   a. monitoring usage of a network to identify a communication session and a service level associated with the communication session;
   b. determining at least one alternative service level for the communication session;
   c. causing conveyance, during the communication session, of an offer of a choice of the at least one alternative service level, the offer comprising information indicative of the at least one alternative service level;
   d. receiving an input responsive to the offer; and
   e. responsive to the input being indicative of acceptance of the offer, causing a change in the service level associated with the communication session to a selected one of the at least one alternative service level, wherein the information indicative of the at least one alternative service level comprises an indication of a degree of improvement associated with at least one of the at least one alternative service level.

2. A method as defined in claim 1, further comprising the step of determining at least one price, each of the at least one price being associated with a respective one of the at least one alternative service level.

3. A method as defined in claim 2, wherein causing a change in the service level associated with the communication session comprises causing the price associated with the selected one of the at least one alternative service level to be charged to a purchaser.

4. A method as defined in claim 3, wherein causing the price associated with the selected one of the at least one alternative service level to be charged comprises debiting the price from a customer account.

5. A method as defined in claim 3, wherein causing the price associated with the selected one of the at least one alternative service level to be charged comprises initiating a web-based payment.

6. A method as defined in claim 2, wherein the at least one price includes a negative price.

7. A method as defined in claim 6, wherein causing a change in the service level associated with the communication session comprises causing at least one of a payment, a refund, a credit and a discount.

8. A method as defined in claim 2, wherein the offer is indicative of the at least one price.

9. A method as defined in claim 2, wherein at least one of the at least one price is one of the following:
   a. a price per quantity of data;
   b. a price per communication session; and
   c. a price per quantity of time.

10. A method as defined in claim 1, wherein monitoring usage of a network further comprises determining a level of network utilization.

11. A method as defined in claim 10, wherein monitoring usage of a network further comprises deriving from the level of network utilization an availability of network resources.

12. A method as defined in claim 11, wherein the at least one alternative service level is determined on a basis of the availability of network resources.

13. A method as defined in claim 10, wherein the at least one alternative service level is determined on a basis the level of network utilization.

14. A method as defined in claim 10, wherein determining a level of network utilization includes identifying a level of occupancy of at least one network resource.

15. A method as defined in claim 1, wherein the offer causes a graphical user interface component to be displayed at a network communication device.

16. A method as defined in claim 15, wherein the graphical user interface display component includes a visual pane for displaying information indicative of the at least one alternative service level.

17. A method as defined in claim 16, wherein the offer includes a query inviting a user at the network communication device to supply an indication of interest in a change of service level, the visual pane being displayed in response to the indication of interest.

18. A method as defined in claim 15, wherein the graphical user interface display component comprises a pop-up window.

19. A method as defined in claim 1, wherein the offer is conveyed via an e-mail message.

20. A method as defined in claim 19, wherein the e-mail message includes instructions on providing the input.

21. A method as defined in claim 20, wherein the instructions include a directive for at least one of: following a link and sending an e-mail message.

22. A method as defined in claim 1, wherein causing a change in the service level associated with the communication session comprises issuing instructions to network equipment for processing data associated with the communication session.

23. A method as defined in claim 22, wherein the network equipment is a network access device.

24. A method as defined in claim 22, wherein the instructions include instructions for causing the network equipment to ensure that the data associated with the communication session includes an identifier indicative of the selected service level.

25. A method as defined in claim 1, wherein monitoring usage of a network further comprises determining a customer network usage.

26. A method as defined in claim 25, wherein the at least one alternative service level is determined on a basis of the customer network usage.

27. A method as defined in claim 1, wherein causing a change in the service level associated with the communication session comprises changing a customer network access setting.

28. A method as defined in claim 27, wherein the network access setting is a bandwidth allocation.

29. A method as defined in claim 1, further comprising selecting from among a plurality of customers a particular customer to which to convey the offer.

30. A method as defined in claim 29, wherein the particular customer is selected on a basis of at least one of customer billing, past acceptances of other offers, potential effect of an acceptance of the offer and past customer behavior.

31. A method as defined in claim 1, wherein the at least one alternative service level is a single alternative service level, wherein the offer is an offer to select the single alternative service level.

32. A method as defined in claim 1, wherein the at least one alternative service level includes a plurality of alternative service levels, wherein the offer includes an incitation to select one of the plurality of alternative service levels.

33. A method as defined in claim 1, wherein the communication session involves a user at a first location, the offer being destined for the user at the first location.

34. A method as defined in claim 1, wherein the communication session involves a user at a first location, the offer being destined for a recipient at a second location different from the first location.

35. A method as defined in claim 1, wherein the at least one alternative service level comprises an alternative service level that is lower than the service level associated with the communication session.

36. A method as defined in claim 1, wherein the selected one of the at least one alternative service level is identified in the input.

37. A method as defined in claim 1, wherein the indication of improvement comprises a scale on which each of the at least one alternative service level is represented.

38. A method as defined in claim 1, Wherein the offer is conveyed via an instant message.

39. A method as defined in claim 1, wherein causing a change in the service level associated with the communication session comprises causing data packets associated to the communication session to be associated to the selected one of the at least one alternative service level.

40. A system comprising a server, the server comprising a processor coupled to a memory and having:
   a. a network monitoring module for monitoring usage of a network to identify a communication session and service level associated with the communication session;
   b. a service level analysis module for determining at least one alternative service level for the communication session;
   c. a communication processing entity for:
   i. causing conveyance, during the communication session, of an offer of a choice of the at least one alternative service level, the offer comprising information indicative of the at least one alternative service level;
   ii. receiving an input responsive to the offer; and
   iii. responsive to the input being indicative of acceptance of the offer, causing a change in the service level associated with the communication session to a selected one of the at least one alternative service level,
   wherein the information indicative of the at least one alternative service level comprises an indication of a degree of improvement associated with at least one of the at least one alternative service level.

41. A system as defined in claim 40, wherein the network monitoring module is operative for determining a level of network utilization.

42. A system as defined in claim 41, wherein the network monitoring module is operative for deriving from the level of network utilization an availability of network resources.

43. A system as defined in claim 42, wherein the service level analysis module determines the at least one alternative service level on the basis of the availability of network resources.

44. A system as defined in claim 41, Wherein the service level analysis module determines the at least one alternative service level on the basis of the level of network utilization.

45. A system as defined in claim 40, the service level analysis module is operative for determining at least one price, each of the at least one price being associated with a respective one of the at least one alternative service level.

46. A system as defined in claim 45, wherein the communication processing entity is further operative for causing the price associated with the selected one of the at least one alternative service level to be charged to a purchaser.

47. A system as defined in claim 45, wherein the communication processing entity charges the price associated with the selected one of the at least one alternative service level to be charged to a purchaser by causing at least one of a payment, a refund, a credit and a discount.

48. A system as defined in claim 40, wherein the communication processing entity is operative for causing a graphical user interface component to be displayed at a network communication device, the graphical user interface component communicating the offer to a user at the network communication device.

49. A system as defined in claim 48, wherein the graphical user interface display component includes a visual pane for displaying information indicative of the at least one alternative service level.

50. A system as defined in claim 48, wherein the graphical user interface display component comprises a pop-up window.

51. A system as defined in claim 40, wherein the communication processing entity is operative for issuing instructions to network equipment to process data associated with the communication session in accordance with the selected one of the at least one alternative service level.

52. A system as defined in claim 51, wherein the network equipment comprises a network access device.

53. A system as defined in claim 51, wherein the instructions include instructions for causing the network equipment to transmit an identifier indicative of the selected service level with the data associated with the communication session.

54. A system as defined in claim 40, wherein the network monitoring module is operative for determining a customer network usage.

55. A system as defined in claim 54, wherein the service level analysis module determines the at least one alternative service level on the basis of the customer network usage.

56. A system as defined in claim 40, wherein the network monitoring module is operative for selecting from among a plurality of customers a particular customer to which to convey the offer.

57. A system as defined in claim 56, wherein the network monitoring module is operative for selecting the particular customer on a basis of at least one of: customer billing, past acceptances of other offers, potential effect of an acceptance of the offer and past customer behavior.

58. A system as defined in claim 40, wherein the communication processing entity is operative for causing the offer to be conveyed to a user at a first location.

59. A system as defined in claim 40, wherein the communication session involves a user at a first location, the communication processing entity being operative for causing the offer to be conveyed to a recipient at a second location different from the first location.

60. A system as defined in claim 40, wherein the communication processing entity is operative to cause a conveyance of an e-mail message communicating the offer.

61. A system as defined in claim 40, wherein the communication processing entity is operative to cause a conveyance of an instant message communicating the offer.

62. A graphical user interface implemented on a network communication device configured to conduct a communication session associated with a service level, the graphical user interface comprising:
   a. a first display component configured to be displayed upon receipt from an entity external to the network communication device of a command, the display component indicative of an availability of at least one alternative service level for the communication session, the command being received during the communication session;

b. a selection tool for allowing the offer to be accepted, thereby to cause a change in the service level associated with the communication session; and c. a second display component indicative of the at least one alternative service level, wherein the selection tool allows identification of a selected one of the at least one alternative service level, wherein acceptance of the offer causes the service level to change to the selected one of the at least one alternative service level, and wherein the second display component displays a respective indication of a degree of improvement associated with each of the at least one alternative service level.

63. A graphical user interface as defined in claim 62, wherein each of the first display component and the second display component comprises a respective visual pane.

64. A graphical user interface as defined in claim 63, wherein the visual pane of the first display component and the visual pane of the second display component are displayed within a common window.

65. A graphical user interface as defined in claim 64, wherein the common window is a pop-up window.

66. A graphical user interface as defined in claim 62, wherein the change in the service level is a change to a particular one of the at least one alternative service level.

67. A graphical user interface as defined in claim 62, further comprising a user-actuatable control associated with the first display component, wherein actuation of the user-actuatable control causes the second display component to be displayed.

68. A graphical user interface as defined in claim 62, wherein the first display component comprises a pop-up window.

69. A graphical user interface as defined in claim 62, wherein said first display component is displayed in a portion of a window dedicated to the communication session.

70. A graphical user interface as defined in claim 62, wherein the second display component displays a respective price associated with each of the at least one alternative service level.

71. A graphical user interface as defined in claim 62, wherein the first display component comprises an audio cue.

72. A computer program product, comprising a non-transitory computer usable medium having a computer readable program code embodied therein, said computer readable program code adapted to be executed to implement a method comprising the steps of:

a. monitoring usage of a network to identify a communication session and a service level associated with the communication session;

b. determining at least one alternative service level for the communication session;

c. causing conveyance, during the communication session, of an offer of a choice of the at least one alternative service level, the offer comprising information indicative of the at least one alternative service level;

d. receiving an input responsive to the offer; and f. responsive to the input being indicative of acceptance of the offer, causing a change in the service level associated with the communication session to a selected one of the at least one alternative service level, wherein the information indicative of the at least one alternative service level comprises an indication of a degree of improvement associated with at least one of the at least one alternative service level.

\* \* \* \* \*